3,669,743
RECHARGEABLE ELECTROCHEMICAL CELL WITH SOLID ZINC SALT COMPLEX ELECTROLYTE

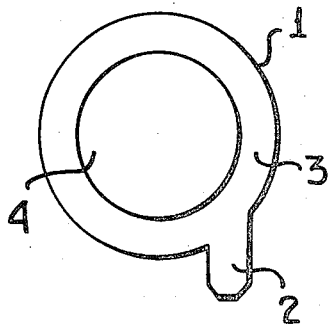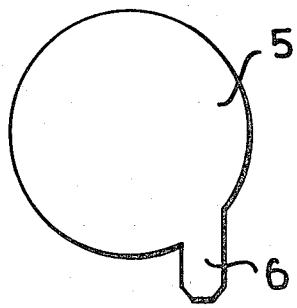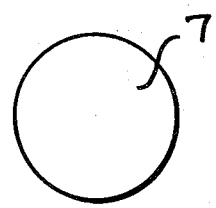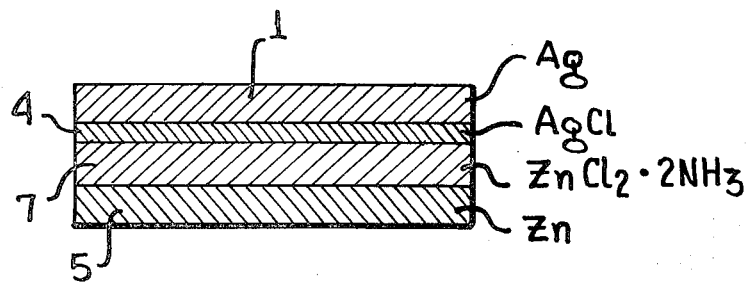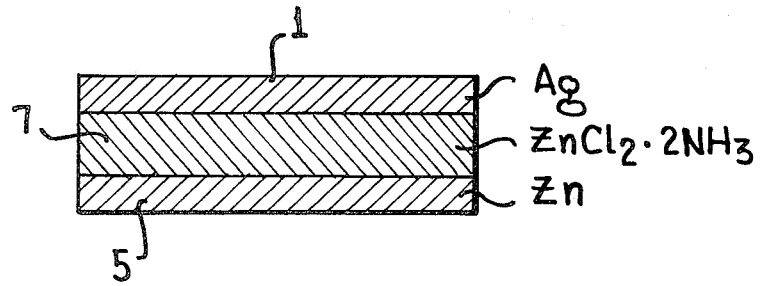

Frank E. Swindells, Arlington, Va., assignor to Melpar, Inc., Falls Church, Va.
Filed Apr. 14, 1969, Ser. No. 815,717
Int. Cl. H01m *21/00, 35/00*
U.S. Cl. 136—6                    15 Claims

ABSTRACT OF THE DISCLOSURE

An electrochemical cell has a zinc electrode and a silver electrode between which is positioned a solid non-hygroscopic electrolyte in the form of a complex compound of a zinc salt with ammine, hydrazine, hydroxylamine, or aniline; such as zinc chloride ammine. A further layer of silver chloride may initially be disposed between the solid complex and the silver electrode, or may subsequently be formed in that location upon charging of the cell. The preferred salts to be converted to the complex are zinc chloride, zinc bromide, and zinc sulfate.

BACKGROUND OF THE INVENTION

The field of energy storage, to which my invention is related, has become increasingly concerned with minaturization, as evidenced by industrial production in recent years of a wide variety of tiny but highly sophisticated electric cells. Interest in solid state batteries has widened, such batteries very generally comprising a solid electrolyte layer sandwiched between plate-like anode and cathode to which conductive leads are connected as required to supply an output voltage to a utilization device.

The performance of solid state batteries employing zinc chloride, a rather popular electrolyte, is optimized by the addition of at least a trace of moisture. Unfortunately, a problem arises in attempts to reduce the thickness of the zinc chloride layer because that electrolyte is extremely hygroscopic, continually absorbing water from the surrounding atmosphere until it achieves an entirely liquid state. For electrolyte layers approaching thin film dimensions, the spontaneous conversion from solid zinc chloride to a liquid, in the presence of the normal atmosphere, occurs so quickly that it becomes virtually impossible to fabricate and encapsulate a complete battery, short of using expensive and complex controlled atmosphere techniques. Moreover, the wet zinc chloride corrodes the usual zinc electrode layer against which it is positioned.

The invention to be disclosed in this application is primarily the result of an effort to provide improved solid state and thin film batteries in which a zinc salt such as zinc chloride is converted to a complex compound to retain the desirable electrolyte conductivity but in which the tendency of an electrolyte composed entirely of the zinc salt to absorb water is substantially if not entirely eliminated.

SUMMARY OF THE INVENTION

The attainment of that objective or effort is consummated by a conversion of the zinc salt to a complex compound, that is, an electrolyte composition containing one or more additional compounds or ions, which complex compound retains the desirable electrical (ionic, as contrasted with electronic) conductivity of the original zinc salt electrolyte but loses its undesirable (when used in thin layers or films) high affinity for water.

In line with the previously noted objective, then, this invention seeks to provide a non-hygroscopic electrolyte, specifically including a zinc salt, such as zinc chloride, that will permit relatively simple fabrication of solid state batteries without sacrificing their electrical activity and output, and in fact will provide substantial improvement in their stability.

A related object is the elimination of corrosion of the zinc electrode, which is a rather fortuitous result of the non-hygroscopic nature of the improved electrolyte.

In its basic aspects, my invention encompasses a conversion of the zinc salt to a complex compound with ammine, hydrazine, hydroxylamine, or aniline to function as a substantially non-hygroscopic solid electrolyte. In one embodiment, zinc chloride is converted to the diamine, and that complex inorganic compound is used as the electrolyte in a solid state battery. As is well known, dry ammonia gas ($NH_3$) reacts with dehydrated salts of certain metals to form solid ammines. My invention contemplates formation of the zinc chloride ammine without deviation from standard chemical procedures, but that does not lessen its significance because it is the recognition that such a complex compound combines the desirable electrolytic characteristics of simple zinc chloride with a desirable reduction of the affinity for water and a consequent stability that makes it ideal for use in solid state batteries, that is noteworthy and constitutes the exercise of inventive faculty here.

In a typical procedure, conversion to the diammine is accomplished by exposing anhydrous zinc chloride to ammonia gas. The resulting zinc chloride ammine,

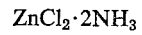

$$ZnCl_2 \cdot 2NH_3$$

is then dried, pressed into pellets, and the pellets conditioned in a high relative humidity atmosphere. Finally, the conditioned pellets are compressed between electrode strips of silver and zinc to form the solid state cell. Although it is now in a discharged state where the immediately preceding procedure is followed, the cell may be conveniently and rapidly charged by application of a low level D-C voltage, which converts a portion of the zinc salt to the metal and forms an equivalent amount of silver chloride (AgCl). A substantial amount of the energy thus stored is recoverable upon discharge of the cell, and the cell may be recycled through several successive charging and discharging periods without apparent deterioration.

BRIEF DESCRIPTION OF THE DRAWINGS

The above and still further objects, features and advantages of the invention will be better understood by reference to the ensuing detailed description, which refers to the following figures of drawing.

FIGS. 1 and 2 are plan views of electrodes for use in the cell;
FIG. 3 is a plan view of the solid electrolyte; and
FIGS. 4 and 5 are sectional views of assembled cells.

DESCRIPTION OF THE PREFERRED EMBODIMENTS

In one embodiment, the solid electrolyte composed of a zinc salt complex is provided in the form of a flexible sheet structure in which a fibrous or porous membrane is impregnated with the solid electrolyte. In the following example of such an embodiment an electrochemical cell having the structure

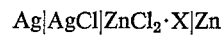

$$Ag|AgCl|ZnCl_2 \cdot X|Zn$$

was formed, where X is the compound forming the complex with the zinc salt.

Example 1

In the preparation of the Ag|AgCl half cell, a sheet of 1.5 ml Ag was cut in the shape of a circular electrode 1

(FIG. 1) with an extension 2 suitable for making conductive connection to the cell. The electrode was then cleaned by immersion in benzene in an activated ultrasonic cleaning unit, after which it was subjected to successive rinses of acetone, distilled water, and grain alcohol. To provide the necessary rigidity for further treatment, a layer of dielectric tape (e.g., Scotch brand, No. 470) was applied to the "back" of the electrode, and the "front" side was masked with the same tape (in the region designated by reference numeral 3) to expose a circular area of 6.45 square centimeters (approximately 1⅛ inches in diameter) on which to provide a layer 4 of AgCl. To that end, the masked electrode was placed in a dilute (approximately 0.2 N) HCl bath for conversion of about $15\mu$ of the silver to about $37\mu$ of AgCl by electrolysis at a rate of 3.88 ma./cm.$^2$, thereby producing a 25 ma. h. cell capacity. The resulting Ag|AgCl half cell was then immersed in distilled water for several hours, removed, and dried.

The Zn electrode 5 (FIG. 2) was prepared by cutting and cleaning a sheet of 2.0 mil Zn in the same manner as that described above for the Ag electrode. Thereafter, the Zn electrode was amalgamated by rubbing with a 10 percent solution of $HgCl_2$. Rigidification was again accomplished with the aid of a layer of the aforementioned dielectric tape.

The electrolyte was prepared by dipping $100\mu$ thick filter paper (e.g., No. 50, made by W. & R. Balston, Ltd.) into a solution of $ZnCl_2$ and $H_2O$ (100 g. $ZnCl_2$, and 50 ml. $H_2O$), after which is was exposed to ammonia gas for a period of about 72 hours while being dried in a desiccator containing $CaSO_4$ (e.g., Dririte brand desiccant). The complex compound thus obtained was found to possess high electrical AC resistance, which dropped to 10 ohms or less following exposure to an atmosphere of high humidity (about 93% relative humidity in this example) for a period from 1½ to 2 hours. After the latter step, the electrolyte was found to have experienced a weight gain of 10.6 percent, corresponding to the addition of one molecule of water. The complex compound formed by this process has $ZnCl_2 \cdot Zn(OH)_2$ as a major component.

In assembling the cell, one or two layers of electrolyte prepared as set forth above was placed between the Ag|AgCl half cell and the Zn (Hg) electrode. In a typical embodiment, an electrolyte 7 having a disk shape as shown in FIG. 3, was composed of a sufficient number of layers (again, usually one or two) to provide it with a composite thickness of 0.008 inch, while the positive electrode (i.e., the Ag|AgCl half cell) was 0.002 inch thick and the negative (Zn) electrode was also 0.002 inch thick. Electrolyte 7 was placed in direct contact and overlying relationship with AgCl region 4 (FIG. 4), and the Zn electrode then placed against the electrolyte, the three sharing a common axis and the two electrode extensions 2 and 6 lying in spaced-apart relationship at a common "end" of the cell. Finally, a moisture barrier was applied, in the form of another layer of dielectric tape to each electrode and the entire cell dipped in a krylon solution for coating thereby.

Immediately after fabrications, the cell was tested to determine its electrical characteristics. The open circuit voltage was approximately 1.0 volt, with the $Zn|ZnCl_2 \cdot X$ half cell contributing a potential of about 0.768 volt and the Ag|AgCl half cell a potential of about 0.22 volt. The AC resistance was under 10 ohms, ranging from 4 to 10 ohms in most of the units fabricated. The theoretical capacity of a cell fabricated in the manner set forth above (25 ma. h.), is limited by the thickness of the AgCl.

Such an electrochemical cell is rechargeable, and can be subjected to several cycles of discharging and charging without substantial degradation. The number of cycles is increased by overcharging the cell, provided the charging potential has a magnitude below that which would cause short circuiting of the cell. The latter value was found to range from 1.4 to 1.6 volts for many of the cells fabricated in the manner above.

Example 2

A cell essentially similar to that of Example 1 was fabricated using a different porous membrane in place of the filter paper. In particular, Metricel, type SL (available from Gelman Instrument Company, Ann Arbor, Mich.), having a pore diameter of $0.8\mu$ was used instead of filter paper, and dipped in the zinc chloride solution. The remaining steps were the same. The resulting cell had a DC resistance of 20 ohms, and was quite similar to that fabricated by Example 1 in all other electrical properties.

Example 3

Using the same procedure and materials as in Example 1, a cell was fabricated with an active area of 5 centimeters by 10 centimeters. Its flexible character and operability in a deformed (from a flat or planar configuration) condition were demonstrated by wrapping the cell around a 1⅛ inch diameter tube of Lucite (Dupont) and taping it in place with pressure sensitive tape. The cell had an open circuit voltage of 0.92 volt in this condition.

In the following four examples, numbered 4 through 7, inclusive, voltaic cells were prepared from the diamine and related solid electrolytes. Complexes of zinc chloride with hydrazine, hydroxylamine, or aniline will also function as electrolytes. Other zinc salts such as zinc bromide and zinc sulfate also form amines and basic salts which are exemplary of complex compounds suitable as non-hygroscopic solid electrolytes in accordance with my invention.

Example 4

1.5 grams of zinc chloride diammine, which had been dried over concentrated sulfuric acid, was pulverized, mixed with 2.5% ethylene glycol and 2.5% water, and pressed into a pellet (approximately 2.84 centimeters in diameter, and 1.1 millimeter thick). Resistance of the pellet was measured after pressing graphite discs on opposite sides of the pellet, and was found to be 130 ohms, using an AC bridge. The pellet was then placed between a sheet of zinc and a sheet of silver, the latter having had $40\mu$ of silver chloride deposited electrolytically thereon. With the several layers secured together and operated as a battery, the open circuit voltage ($E_o$) was initially 1.10 volts, and the cell exhibited the following discharge characteristics:

| Time | $E_o$, volts | $E_L$, volts | $R_L$, ohms | I, $\mu$A. |
|---|---|---|---|---|
| 0 | 1.10 | 1.08 | 2,000 | 460 |
| 30 minutes | 1.01 | 0.95 | 500 | 1,320 |
| 2 hours | 0.96 | 0.88 | 900 | 800 |
| 3 hours, 30 minutes | 0.93 | 0.82 | 800 | 800 | where $E_L$ is the voltage across the load, $R_L$ is the load resistance, and I the current through the load.

After subsequent charging for 64 hours from a 1.5 volt dry battery through a 3000 ohm resistor, the cell was again discharged, with the following data obtained.

| Time | $E_o$, volts | $E_L$, volts | $R_L$, ohms | I, $\mu$A. |
|---|---|---|---|---|
| 0 | 1.10 | 0.95 | 900 | 820 |
| 30 minutes | 0.95 | 0.87 | 4,000 | 200 |
| 5 hours | 0.87 | 0.86 | 4,000 | 200 |
| 28 hours | 0.72 | 0.28 | 4,000 | 70 |

Example 5

An ethylene diammine complex was formed by evaporating an aqueous solution containing 0.05 mol of zinc chloride and 0.1 mol of ethylene diamine. The product was pressed into a pellet about 2 millimeters thick, exposed to 93% relative humidity for 3 hours, and tested as in Example 4. The AC resistance was 100 ohms and the open circuit voltage was 1.1 volts.

Example 6

A pyridine complex was formed by combining 6.8 grams of zinc chloride and 7.9 grams of pyridine in dilute water solution. After drying for five days at room temperature, the product was heated for two hours at 80° C. A dry powder weighing 13.5 grams was thereby obtained. Testing proceeded as in Example 4, after pressing into a pellet and conditioning in 93% relative humidity. The complex had a resistance of 40 ohms and an open circuit voltage of 0.9 volt.

Example 7

A pellet similar to that of Example 4 was pressed from $ZnCl_2 \cdot 4Zn(OH)_2$ powder. After conditioning and testing as in Example 4, the following performance was observed, for the specified variation in load resistance in the sequence recited:

| $E_o$, volts | $E_L$, volts | I, $\mu$A. | $R_L$, ohms |
|---|---|---|---|
| 0.92 | 0.90 | 0.095 | 10,000 |
| 0.92 | 0.89 | 0.186 | 5,000 |
| 0.91 | 0.88 | 0.300 | 3,000 |
| 0.91 | 0.84 | 0.810 | 1,000 |
| 0.89 | 0.78 | 2.0 | 400 |
| 0.87 | 0.74 | 5.0 | 250 |

In the following examples, numbered 8 and 9, the solid electrolyte was dispersed in an organic binder. In addition to the particular binders which are recited in these two examples, other suitable binder materials are polyvinylpyrolidone, polyvinylamine, partially hydrolysed polyvinyl acetate, hydroxy propyl cellulose, polyvinyl methyl ether, and methyl cellulose.

Example 8

A one pint ball mill half filled with ⅛" diameter porcelain balls was charged with 30 g. of zinc chloride diammine and 50 ml. of toluene. After milling for four hours, a solution of 10 g. of ethyl cellulose in 50 ml. of toluene was added, and the milling continued overnight. A portion of the dispersion was cast as a film on plate glass, using a "doctor knife" set 0.02 cm. above the glass. After drying at room temperature the smooth, coherent film was 0.004 cm. thick and stripped easily from the glass. A piece 1¼" diameter was cut and placed between strips of silver and zinc, and conditioned in 93% relative humidity for four hours. An open circuit potential of 0.95 volt was observed. The silver was replaced by a disc of silver-silver chloride prepared as in Example 1. The following measurements were taken:

| $E_o$, volts | $E_L$, volts | I, $\mu$A. | $R_L$, ohms |
|---|---|---|---|
| 0.87 | 0.73 | 400 | 1,700 |
| 0.86 | 0.78 | 200 | 3,700 |
| 0.87 | 0.81 | 100 | 7,700 |

Example 9

A film having Polyox (polyethylene oxide) supplied by Union Carbide Corp.) resin WSR-N750 as the binder, was made by a process similar to Example 3. The mill was charged with 30 g. of zinc chloride diammine, 30 g. of isopropyl alcohol, 2 ml. water and 3.5 g. of a solution of the resin in isopropyl alcohol, and milled for three days. 35 g. of the 14% resin solution was added, and the milling continued for two hours. The resulting suspension was then cast 0.06 cm. thick on a Teflon film. After drying the film stripped spontaneously and was 0.023 cm. thick. This was fabricated into a battery having the same structure as Example 1, except that a disc of the polymer replaces the impregnated filter paper. The open circuit voltage was 1.014 and the following relation between the load voltage and current obtained:

| $E_L$, volts: | I, mA. |
|---|---|
| 1.014 | 0 |
| 0.957 | 4 |
| 0.917 | 10 |
| 0.876 | 20 |
| 0.812 | 40 |

It is not essential that the cell be fabricated in a charged state, as is the situation when the procedure described in Example 1 is followed, or as is provided by any technique in which a layer or strip of silver chloride is disposed between the zinc salt complex and the silver electrode as shown in section in FIG. 4. Rather, the electrolyte may be placed between and in contact with an Ag electrode and Zn electrode, which constitutes the discharged state of the electrochemical cell, as is shown in section in FIG. 5. Upon charging (e.g., by applying a voltage of about 1.2 volts), part of the zinc salt is converted to the metal and forms an equivalent amount of silver chloride, the cell thereby taking on the configuration shown in FIG. 4.

The trace of water required for operation of any of the cells fabricated in accordance with my invention may be replaced with a trace of humectant, such as ethylene glycol.

I claim:

1. In a rechargeable electrochemical cell having a positive electrode and a negative zinc electrode, a solid substantially non-hygroscopic electrolyte comprising a zinc salt, wherein said zinc salt is selected from the group consisting of zinc chloride, zinc bromide and zinc sulfate complexed with a compound selected from the group consisting of amine, hydrazine hydroxylamine, and aniline.

2. The cell according to claim 1 wherein the positive electrode is silver.

3. The solid state battery according to claim 1 wherein the positive electrode is silver and wherein a layer of silver chloride is disposed between and in contact with said silver electrode and said electrolyte.

4. The cell according to claim 1 wherein a trace of water is incorporated within the electrolyte.

5. The cell according to claim 1 wherein said electrolyte includes a trace of a humectant.

6. A solid state battery, comprising
   a silver electrode,
   a zinc electrode, and
   a solid non-hygroscopic electrolyte layer consisting essentially of a zinc salt complex compound in the form of a thin film of less than .01" in thickness disposed between the electrodes, said compound selected from the group consisting of zinc chloride amine, zinc chloride hydrazine, zinc chloride hydroxylamine, and zinc chloride aniline.

7. The battery according to claim 6 wherein said zinc chloride complex compound is selected from the group consisting of zinc chloride amine, zinc chloride hydrazine, zinc chloride hydroxylamine, and zinc chloride aniline.

8. The solid state battery according to claim 6 further including a layer of silver chloride located between and in contact with said solid electrolyte and said silver electrode.

9. The battery according to claim 7 wherein the solid electrolyte layer contains a trace of water.

10. The cell according to claim 1 wherein said electrolyte is impregnated into a porous membrane.

11. The cell according to claim 1 wherein said electrolyte is dispersed in an organic binder.

12. A solid state cell, comprising first and second spaced metal layers constituting electrodes of said cell, and a complex compound of a zinc salt in the form of a solid layer interposed between and secured to said metal layers as the electrolyte for said cell, wherein said zinc salt is selected from the group consisting of zinc chloride, zinc bromide, and zinc sulfate, wherein said complex compound is a combination of said zinc salt with a further compound that renders the overall complex compound substantially non-hygroscopic, wherein said further compound is selected from the group consisting of an amine, a hydrazine, a hydroxylamine, an aniline, and a pyridine.

13. The cell according to claim 12 wherein said first and second metal layers comprise zinc and silver, respectively.

14. The cell according to claim 13 wherein said second layer includes a further layer of silver chloride.

15. The cell according to claim 14 wherein said solid electrolyte layer is less than approximately 0.01 inch thick.

References Cited

UNITED STATES PATENTS

| | | | |
|---|---|---|---|
| Re. 24,408 | 12/1957 | Hack et al. | 136—83 |
| 2,762,858 | 9/1956 | Wood | 136—103 |
| 2,861,116 | 11/1958 | Grubb, Jr. | 136—106 |
| 2,928,890 | 3/1960 | Vander Grinten et al. | 136—83 |
| 3,073,884 | 1/1963 | Pinkerton | 136—100 |
| 3,185,590 | 5/1965 | Mayer et al. | 136—6 |
| 3,375,135 | 3/1968 | Moulton et al. | 136—6 |
| 3,415,688 | 12/1968 | Foucry | 136—100 |
| 3,513,027 | 5/1970 | Liang et al. | 136—83 |
| 3,078,327 | 2/1963 | Lieb | 136—83 |
| 3,547,700 | 12/1970 | Swindells | 136—83 |

ANTHONY SKAPARS, Primary Examiner

U.S. Cl. X.R.

136—111, 153